UNITED STATES PATENT OFFICE 2,451,740

PROCESS FOR THE MANUFACTURE OF AN ALDEHYDE

Herbert Lindlar, Basel, Switzerland, assignor to Hoffmann-La Roche Inc., Nutley, N. J., a corporation of New Jersey No Drawing. Application June 7, 1947, Serial No. 753,379. In Switzerland December 24, 1946

13 Claims. (Cl. 260—598)

Ishikawa and Matsuura have described the manufacture of an aldehyde $C_{14}H_{22}O$. 4-(2',6',6'-trimethyl-cyclohexene-(1')-yl)-2-methyl-butene-(2)-al-(1) (IV) from β-ionone (I) and a halogeno acetic ester (Chem. Zentralblatt 1937, II, 3452). Later on N. Milas referred to the synthesis of this aldehyde (U. S. Patents Nos. 2,369,156 and 2,369,160–167). Heilbron and co-workers proved (J. Chem. Soc. 1942, 727; 1946, 502) that the aldehyde, contrary to prior statements, possesses a structure corresponding to formula IV, the double bond being in the α,β-position with respect to the carbonyl group. Heilbron states the reaction to take the following course, "R" in formula II being lower alkyl, e. g., ethyl:

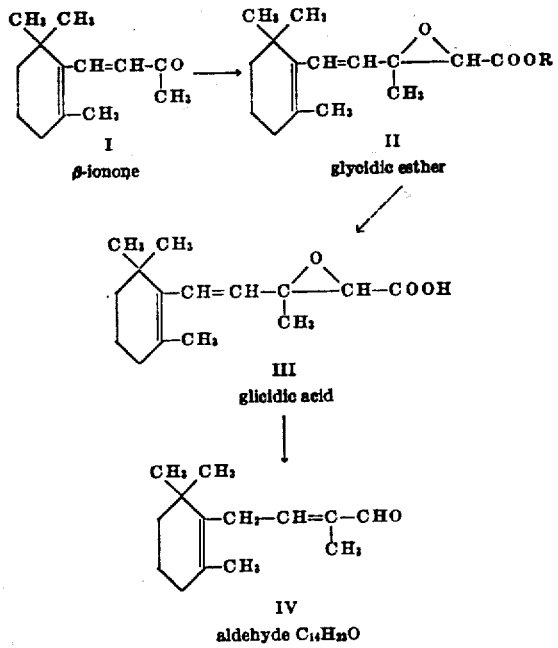

I
β-ionone

II
glycidic ether

III
glicidic acid

IV
aldehyde $C_{14}H_{22}O$

Heilbron et al. have carried out the synthesis in 3 separate steps, the reaction between β-ionone and halogeno acetic ester being completed by heating for several hours. In every instance the condensation product was isolated in high vacuo for purification purposes, the temperature thereby ranging up to 160° C. Hydrolisation of compound II was effected by an alcoholic alkali solution. The products, which were insoluble in aqueous alkali, were thrown away. The parts soluble in aqueous alkali were either decarboxylated by treatment with a mineral acid (Chem. Zentralblatt 1937, II, 3452) or the glycylic acid III was isolated therefrom and it was subsequently tried to split off carbon dioxide by heating in the presence of copper powder (J. Chem. Soc. 1942, 727; 1946, 502) or by boiling with organic bases (U. S. Patent No. 2,369,160). All these processes lead with rather low yield to an aldehyde $C_{14}H_{22}O$ of low purity.

It was now found, according to the present invention, that the aldehyde $C_{14}H_{22}O$ 4-(2',6',6'-trimethyl-cyclohexene-(1')-yl)-2-methyl-butene-(2)-al-(1) may be obtained with high yield in comparatively pure form by condensing β-ionone with a halogeno acetic ester while avoiding application of high temperatures, treating the condensation product formed with alkali and isolating the aldehyde obtained from the reaction mixture.

For the preparation of the glycidic ester II β-ionone may be condensed either with a mono- or with a di-halogeno acetic ester in a manner known per se. The chloro compounds are especially suitable for this reaction. β-Ionone and a mono halogeno acetic ester are reacted in the presence of an alkaline agent, such as an alkali alcoholate, an alkaline earth alcoholate or an alkali amide. Sodium alcoholate, preferably sodium methylate, is an especially advantageous condensing agent. It is appropriate to carry out the reaction in the absence of a solvent, while using excess quantities of alcoholate and halogeno acetic ester. β-Ionone and di-halogeno acetic ester may be condensed in the usual way with magnesium amalgam. The condensation product formed yields, on treatment with an alkaline agent, the same reaction mass and the same products II and IV. Equally the condensation of β-ionone with monohalogeno acetic ester may be effected with the aid of magnesium amalgam. The condensation of β-ionone with halogeno acetic ester must always be carried out under mild conditions. It is advisable neither to isolate nor to purify the condensation product; it should especially not be distilled. Preferably the condensation product is immediately treated with an alkaline agent. During the whole sequence of reactions the temperature should not be allowed to rise above 50° C. If these mild working conditions are applied the decarboxylation of the glycidic acid III, which hitherto was only observed under acid conditions or on heating, occurs in alkaline milieu simultaneously with the hydrolysation. The aldehyde formed may be isolated nearly quantitatively from the alkaline reaction solution. Distillation is well suited for the purification of the product. If the above mentioned instructions are carefully followed the aldehyde IV of very high purity is obtained.

The aldehyde thus obtained is a yellow oil which solidifies at about −40° C. The properties thereof are identical with those of the aldehyde which Heilbron et al. (J. Chem. Soc. 1946, 502) obtained by the more complicated process from isolated glycylic acid and which they purified by preparing the crystalline phenylsemicarbazone. The aldehyde is well characterized by its ultraviolet absorption spectrum having a distinct absorption maximum at 230 $\mu$. The phenylsemicarbazone has its melting point at 181–182° C, while the thiosemicarbazone melts at 194° C. (uncorrected).

The new process leads to a product of much higher purity. Furthermore, the yield is about four times higher than in the last mentioned known process (J. Chem. Soc. 1946, 502). The whole process may now be executed in a single apparatus in the course of one day.

The term "alkaline agent" as employed in this disclosure and in the claims is meant to define alkali agents and alkaline earth agents.

*Example 1*

20 parts by weight of $\beta$-ionone and 16 parts by weight of chloro acetic ethyl ester are stirred together intensively at an inner temperature of −10° C. 8 parts by weight of pulverized dry sodium methylate are gradually added while excluding air and moisture; the temperature of the reaction mixture is kept at about −8° to −6° C. After completion of the addition stirring and cooling is continued for 4 hours. 60 parts by volume of a 15 per cent. solution of sodium hydroxide in methanol are then added while cooling and stirring is continued for a further 2 hours at +5° C. In order to isolate the aldehyde formed 90 parts of water are added whereupon the mixture is subsequently extracted once with 40 parts by volume and twice with 20 parts by volume of ether. The united ether extracts are twice extracted with 40 parts of water. Then the ether is distilled off and the residue is fractionated in high vacuo. The fraction, boiling between 100 and 120° C., under a pressure of 0.2 mm./Hg, is redistilled and then boils, under 0.5 mm./Hg at 100–102° C. 18–19 parts by weight of the aldehyde are obtained which amounts to a yield of 85–90 per cent. of the theoretical, calculated for $\beta$-ionone.

*Example 2*

20 parts by weight of $\beta$-ionone, 16 parts by weight of chloro acetic ethyl ester and 20 parts by volume of petroleum ether of boiling point 30–70° C. are condensed by the aid of 8 parts by weight of pulverized sodium methylate in the manner indicated in Example 1. After working up 16.5–17.5 parts by weight of the aldehyde are obtained which amounts to a yield of 75–80 per cent. (calculated for $\beta$-ionone).

*Example 3*

20 parts by weight of $\beta$-ionone, 16 parts by weight of chloro acetic ethyl ester are condensed by the aid of 8 parts by weight of sodium methylate in accordance with the indications in Example 1. Water is added in a quantity amounting to four times the quantity of the reaction mass; the mixture is then extracted with ether. The ether is driven off in vacuo at a temperature below +20° C. 30–40 parts by weight of crude glycylic ester still containing some ether are obtained. The product is treated with alcoholic alkali and the aldehyde formed is isolated from the alkaline reaction mixture (as indicated in Example 1).

*Example 4*

7 parts by weight of magnesium are dissolved under nitrogen atmosphere in 495 parts by weight of mercury while heating. After cooling down 300 parts by volume of absolute ether, 55 parts by weight of $\beta$-ionone and 45 parts by weight of chloro acetic ethyl ester are added to the amalgam. The reaction is started by gentle warming and is then kept going by stirring. For completion of the reaction further gentle heating is necessary when the reaction shows signs of dying out. The magnesium compound formed is decomposed with water and dilute acetic acid. The mercury is removed and the reaction mixture is taken up in ether. The ether solution is dried and then boiled down at a temperature not exceeding 40° C. 200 parts by volume of a 15 per cent. methyl alcoholic solution of sodium hydroxide are slowly added to the residue while cooling. After the mixture has been left to stand for 2 hours four times its quantity by volume of water are added. The solution is extracted with ether and the ether solution is washed with water. The residue obtained after driving off the ether is fractionated in high vacuo. The small first running is discarded; the chief quantity distils over at 100–120° C. and is identical with the product obtained according to Examples 1–3.

*Example 5*

7 parts by weight of magnesium are dissolved under nitrogen atmosphere in 495 parts by weight of mercury while heating. The amalgam is left to cool down whereupon 300 parts by volume of absolute ether, 55 parts by weight of $\beta$-ionone and 35 parts by weight of monochloro acetic ethyl ester are added thereto. Further working is effected in accordance with Example 4.

I claim:

1. Process for the manufacture of an aldehyde, comprising condensing $\beta$-ionone with chloro acetic ester in the presence of sodium methylate, directly reacting the condensation product obtained with a methyl alcoholic solution of sodium hydroxide, isolating the aldehyde formed from the part of the reaction mixture which is insoluble in aqueous alkali and keeping the temperature not above 50° C. throughout the reaction.

2. A process which comprises condensing $\beta$-ionone with a halogeno acetic ester and reacting the condensation product with an alkaline agent to produce a compound of the formula:

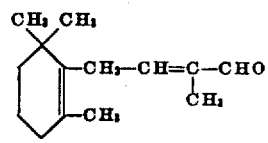

said process being entirely carried out at a temperature not in excess of 50° C.

3. A process according to claim 2 in which the ester is a monohalogeno acetic ester.

4. A process according to claim 2 in which the ester is a dihalogeno acetic ester.

5. A process according to claim 2 in which the condensing is carried out in the presence of an alkaline condensing agent.

6. A process according to claim 2 in which the condensing is carried out in the presence of magnesium amalgam as a condensing agent.

7. A process according to claim 2 in which the condensing is carried out in the presence of alkali alcoholate condensing agent.

8. A process according to claim 2 in which the alkaline agent emplolyed to treat the condensation product is an alcoholic solution of an alkaline agent.

9. A process according to claim 2 in which the alkaline agent employed in the treatment of the condensation product is a methanol solution of sodium hydroxide.

10. A process according to claim 2 in which sodium methylate is employed as a condensing agent to assist in the initial reaction.

11. A process which comprises treating a compound of the formula:

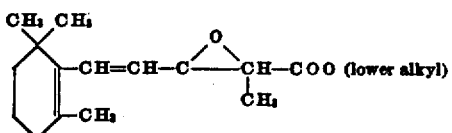

with an alkaline agent at a temperature not in excess of 50° C. to produce the aldehyde of formula:

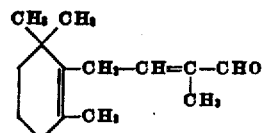

12. A process according to claim 11 in which the alkaline agent is employed in the form of an alcoholic solution thereof.

13. A process according to claim 11 in which the alkaline agent is an alcoholic solution of sodium hydroxide.

HERBERT LINDLAR.

REFERENCES CITED

The following references are of record in the file of this patent:

UNITED STATES PATENTS

| Number | Name | Date |
| --- | --- | --- |
| 2,369,167 | Milas | Feb. 13, 1945 |

OTHER REFERENCES

Heilbron et al., Journal of the Chemical Society (London) 1942, pages 727–733.

Cymerman et al., Journal of the Chemical Society (London) 1946, pages 500–503.

Certificate of Correction

Patent No. 2,451,740.  October 19, 1948.

HERBERT LINDLAR

It is hereby certified that errors appear in the printed specification of the above numbered patent requiring correction as follows:

Column 1, line 2, strike out the period after "$C_{14}H_{22}O$" and insert instead a comma; line 24, for "esther" read *ester*; line 33, for "glicidic" read *glycidic*; column 3, line 13, for the Greek letter $\mu$ read *$m\mu$*; column 4, line 13, for "chloro" read *dichloro*;

and that the said Letters Patent should be read with these corrections therein that the same may conform to the record of the case in the Patent Office.

Signed and sealed this 15th day of February, A. D. 1949.

[SEAL]

THOMAS F. MURPHY,
*Assistant Commissioner of Patents.* condensing is carried out in the presence of magnesium amalgam as a condensing agent.

7. A process according to claim 2 in which the condensing is carried out in the presence of alkali alcoholate condensing agent.

8. A process according to claim 2 in which the alkaline agent emplolyed to treat the condensation product is an alcoholic solution of an alkaline agent.

9. A process according to claim 2 in which the alkaline agent employed in the treatment of the condensation product is a methanol solution of sodium hydroxide.

10. A process according to claim 2 in which sodium methylate is employed as a condensing agent to assist in the initial reaction.

11. A process which comprises treating a compound of the formula:

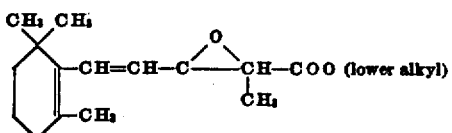

with an alkaline agent at a temperature not in excess of 50° C. to produce the aldehyde of formula:

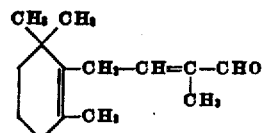

12. A process according to claim 11 in which the alkaline agent is employed in the form of an alcoholic solution thereof.

13. A process according to claim 11 in which the alkaline agent is an alcoholic solution of sodium hydroxide.

HERBERT LINDLAR.

REFERENCES CITED

The following references are of record in the file of this patent:

UNITED STATES PATENTS

| Number | Name | Date |
|---|---|---|
| 2,369,167 | Milas | Feb. 13, 1945 |

OTHER REFERENCES

Heilbron et al., Journal of the Chemical Society (London) 1942, pages 727–733.

Cymerman et al., Journal of the Chemical Society (London) 1946, pages 500–503.

Certificate of Correction

Patent No. 2,451,740.    October 19, 1948.

HERBERT LINDLAR

It is hereby certified that errors appear in the printed specification of the above numbered patent requiring correction as follows:

Column 1, line 2, strike out the period after "$C_{14}H_{22}O$" and insert instead a comma; line 24, for "esther" read *ester*; line 33, for "glicidic" read *glycidic*; column 3, line 13, for the Greek letter $\mu$ read *$m\mu$*; column 4, line 13, for "chloro" read *dichloro*;

and that the said Letters Patent should be read with these corrections therein that the same may conform to the record of the case in the Patent Office.

Signed and sealed this 15th day of February, A. D. 1949.

[SEAL]

THOMAS F. MURPHY,
*Assistant Commissioner of Patents.*